(12) United States Patent
Darmann

(10) Patent No.: US 7,019,608 B2
(45) Date of Patent: Mar. 28, 2006

(54) SUPERCONDUCTING TRANSFORMER

(75) Inventor: Francis Anthony Darmann, Artarmon (AU)

(73) Assignee: Metal Manufactures Limited, Gordon (AU)

(*) Notice: Subject to any disclaimer, the term of this patent is extended or adjusted under 35 U.S.C. 154(b) by 169 days.

(21) Appl. No.: 10/783,301

(22) Filed: Feb. 20, 2004

(65) Prior Publication Data
US 2004/0251999 A1 Dec. 16, 2004

Related U.S. Application Data

(63) Continuation-in-part of application No. 10/239,232, filed as application No. PCT/AU01/00315 on Mar. 21, 2001, now Pat. No. 6,914,511.

(30) Foreign Application Priority Data
Mar. 21, 2000 (AU) .................... PQ6376

(51) Int. Cl.
*H01F 1/00* (2006.01)
(52) U.S. Cl. ................. 335/216; 336/DIG. 1
(58) Field of Classification Search .............. 336/170, 336/DIG. 1, 216, 299; 361/19
See application file for complete search history.

(56) References Cited

U.S. PATENT DOCUMENTS

| | | | |
|---|---|---|---|
| 4,336,561 A * | 6/1982 | Murphy | 361/19 |
| 5,107,240 A * | 4/1992 | Tashiro et al. | 336/60 |
| 6,292,080 B1 * | 9/2001 | Cottevieille et al. | 336/216 |
| 6,300,856 B1 * | 10/2001 | Hanley et al. | 336/222 |
| 6,411,479 B1 * | 6/2002 | Zueger et al. | 361/19 |

FOREIGN PATENT DOCUMENTS

GB 1513153 * 6/1978

* cited by examiner

Primary Examiner—Tuyen T Nguyen

(74) Attorney, Agent, or Firm—Fay Kaplun & Marcin, LLP

(57) ABSTRACT

A superconducting transformer may include two pairs of axially extending windings. The windings are each in the form of a right cylindrical solenoid having a circular cross-section which are substantially concentrically nested. Each winding includes a plurality of turns formed from superconducting tape. Each winding respectively includes a first end and a second end which are configured for electrical connection with at least one of the other ends, an alternating power source, a load, or other passive or active electrical components. The transformer includes a first axially extending primary winding corresponding to the outermost winding and a first axially extending secondary winding nested within the first primary winding. A second axially extending primary winding is nested within the first secondary winding. A second axially extending secondary winding is nested within the second primary winding such that the second secondary winding corresponds to the innermost winding. The transformer further includes three predetermined gaps which define the radial separation of the nested windings. A predetermined core gap defines the diameter of the second secondary, or innermost, winding.

22 Claims, 14 Drawing Sheets

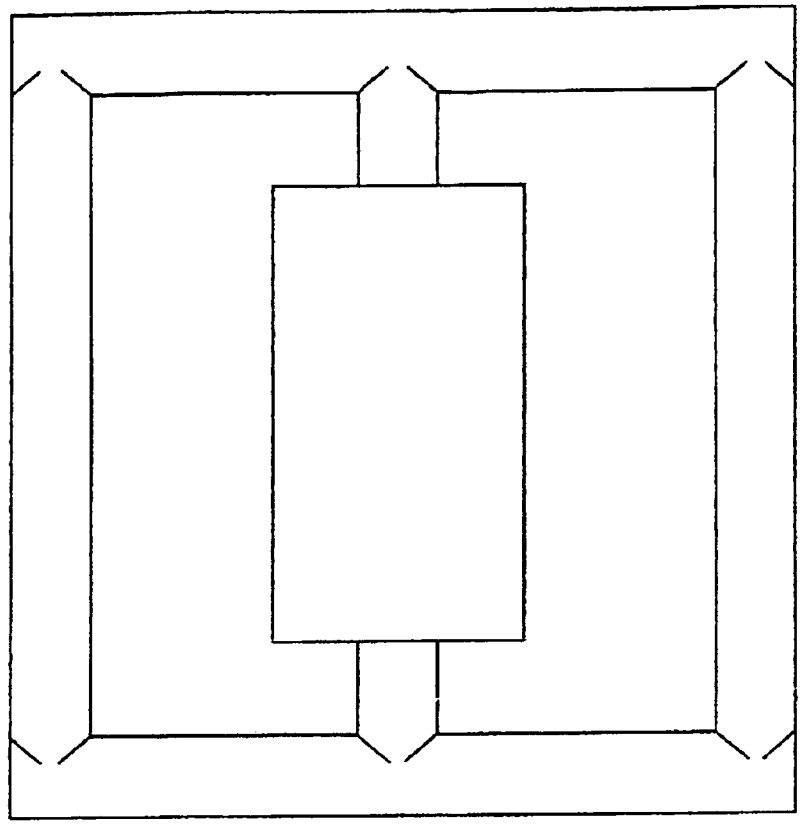

"2500 m 2:1 core 1.75 T"

Rating 100 kVA, 6.6 kV/240 V Star:Star 5.1 A Primary AC current

140 A Secondary AC current

| Core Type | | |
|---|---|---|
| Acore = 0.0052 m² | Limb Length = 0.496 m | Primary coil loss = 25 Watts (calculated) (5 W if twisted) |
| Dcore = 0.081 m | Yoke Length = 0.5909 m | Estimated Secondary coil loss = 25 Watts (5 W if twisted) |
| IDS = 0.1413 m | Imag ~ 0.1 Amps | Core loss = 150 W (1.5 W/kg) |
| ODs = 0.1518 m | Np = 3628 Turns | 3 phase coil losses = 150 Watts (30 W twisted) |
| IDp = 0.1718 | Ns = 132 Turns | Including cryogenic cost = ca 1500 watts (300 W if twisted) |
| ODp = 0.1891 | Ip = 5.1 A rms | Total losses = 1650 Watts (450 W if twisted) (1000 W conventionally) |
| Hp = Hs = 0.406 m | Is = 140 A rms | 3Ph efficiency = 98.35 % (99.55 % if twisted) |
| 3f Vol = 102 litres | Ps = 10 (Secondary Pancakes) | |
| | Pp = 147 (Primary Pancakes) | |

FIG.6

SUPERCONDUCTING TRANSFORMER

The present application is a continuation-in-part of a U.S. patent application Ser. No. 10/239,232 filed Sep. 20, 2002, entitled "SUPERCONDUCTING TRANSFORMER" now U.S. Pat. No. 6,914,511 which is a 371 of PCT/AU01/00315, filed Mar. 21, 2001, the specification of which is expressly incorporated herewith by reference.

FIELD OF THE INVENTION

The present invention relates to a transformer and in particular to a superconducting transformer.

The invention has been developed primarily as a power transformer and will be described hereinafter with reference to that application. However, the invention is not limited to this particular field of use and is also suitable for a transformer requiring high efficiency (that is, low electrical losses), low impedance, or a low external flux leakage. The invention is also applicable to a transformer used in a high-frequency and/or a high current application. In particular, the invention has application to certain transformers with leakage magnetic fields that are too large to leverage the significant benefits afforded by twisted filament superconductor.

BACKGROUND INFORMATION

As is known, when two windings or, generally, any two conductors, are placed side-by-side in close proximity and the first is powered with an AC current, the second will develop an EMF according to Faraday's law. This EMF is developed via the magnetic field created from the current travelling in the first conductor. The EMF will accordingly cause current to flow in the second winding via the relation $I_1 N_1 = I_2 N_2$, where I represents the current in each respective winding and N represents the number of turns in each winding.

In the case of a transformer, the ends of the second (or "secondary") winding are closed to form a complete circuit. Moreover, the current induced in the second winding also produces a magnetic field, but this field will oppose the field produced by the first winding in accordance with Lenz' law.

In many transformers, the common centre is occupied by iron in a closed loop. This is done to present a path of least reluctance for the closed lines of magnetic field to flow. This path is commonly referred to as a low reactance path.

The component of the net magnetic field which does not follow the path of least reluctance is denoted the "magnetic field". However, as will be appreciated by the skilled addressee, this is also known as the "leakage field" or "transformer magnetic field". The magnetic field is not strictly uniform; for the most part, it is concentrated between the windings and acts substantially in an axial direction relative to the windings.

Since both transformer windings generate opposing magnetic fields, a cancellation occurs—at least to some degree—that results in a net leakage flux. The net leakage flux may be reduced by minimising the distance between the primary and secondary windings or, if there are more than two windings, by minimising the maximum separation between any two of them, while allowing sufficient electrical insulation between them.

The net leakage flux results in AC losses when superconducting materials are employed due to the AC nature of the current and voltage. In essence, these losses result because superconductor material is inherently a "non-reversible" material, and possesses a hysteresis loop of finite area. AC losses fall into the following three categories: hysteresis losses; coupling currents; and eddy currents.

Hysteresis losses develop due to the non-reversible magnetisation of the superconductor in a time varying magnetic field. In the sinusoidal steady state (SSS) characterised by a certain frequency, hysteresis losses are substantially fixed with respect to that frequency. However, hysteresis losses depend, in a complex way, on the arrangement of the conductors and the magnitude and direction of the magnetic field.

In general, it has been found that hysteresis losses are often proportional to the first or second power of a magnetic field reduction.

Coupling currents result from time-varying electrical fields, and represent loops of current where part of the loop is through a superconducting medium and part through a normally conductive medium. For example, coupling currents arise in a multi-filament twisted superconducting tape in a metal, or metal alloy, matrix in a 20 mT to 80 mT magnetic field. As the loops of coupling current cross through this medium, a resistive power loss—that is, the coupling current loss—results.

In the SSS, and between 20 mT and 80 mT, the coupling current loss associated with a multi-filament twisted superconducting tape is proportional to the square of the magnetic field amplitude. Outside this range, twisted filaments do not decouple and, therefore, there are no coupling currents and no coupling current losses.

The final substantial source of losses result from eddy currents. Eddy currents result from loops of current that flow entirely in the conducting material and thereby exhibit conventional resistive losses.

Eddy current losses in the SSS, expressed in joules per cubic metre, are proportional to the square of the magnetic field (as well as to the second power of the frequency). Hence, halving the magnetic field will reduce the eddy current losses by a factor of four.

Design principles are generally employed to render eddy current losses very small compared to superconductor losses, which is particularly true in the design of conventional transformers. Since eddy current loss can generally be reduced to a small component of the total AC loss by using well-established techniques, this document largely focuses on hysteresis losses and coupling current losses—which are collectively referred to as "superconductor losses" (or "superconductor loss").

Superconductor loss (that is, the sum of hysteresis loss and coupling current loss) obeys well understood laws when the superconductors are comprised of straight filament tapes and/or when the superconductor is exposed to a magnetic field amplitude less than about 20 mT or greater than about 80 mT. Straight filament tapes are those where the filaments are parallel to the axis of the conductor itself.

In these scenarios, superconductor loss merely demonstrates a linear relationship with magnetic field. For example, reducing the magnetic field by half merely results in a halving of superconductor loss.

The reason the effect is merely linear is because the superconductor loss reduction in these scenarios is composed almost entirely of hysteresis loss. Unfortunately, the coupling loss is only negligible.

It is possible to reduce superconducting losses significantly by employing certain techniques. Two techniques are: twisting, to reduce hysteresis losses; and the use of highly resistive matrix materials, to reduce coupling current losses.

Hysteresis losses are able to be reduced by a factor of 2 to 6 by imparting a twist into the filaments of a superconductor. In essence, when twisted, the individual filaments behave magnetically as distinct units rather than as a large "block" since each does not occupy any one place within the cross section of matrix. Importantly, such reductions are only achievable in a limited window between 20 mT and 80 mT. The actual loss being largely dependent on the twist pitch employed, and the number of layers of filaments within the superconductor.

On a related note, the twist pitch is ideally chosen to be as small as possible, but a twist pitch significantly smaller than the nominal dimension of the superconductor (for example, the diameter of a wire, or the width of a tape) will degrade its current carrying capacity. Experimentally and theoretically, the minimum of twist capable of reducing hysteresis losses has been found to be in the of 4 to 6 mm range.

The employment of highly resistive matrix materials has been shown to reduce coupling current losses. Although the scientific understanding of why some matrix materials are more effective than others is not fully understood, it is believed that it is best to increase the matrix resistivity as much as possible to block the lossy coupling currents from flowing.

There are certain limitations inherent in the above mentioned loss reduction techniques. For example, these methods only reduce superconducting losses within a limited magnetic field amplitude range of 20 mT to 80 mT; a window far too small to be effective in a large power transformers (which typically deliver more than 10 MVA and generate magnetic fields between 200 mT and 500 mT).

The above discussion of the prior art is intended to provide the addressee with some context and is not to be taken as an admission of the state of common general knowledge in the art.

SUMMARY OF THE INVENTION

It is an object of the present invention to overcome or ameliorate at least one of the disadvantages of the prior art, or to provide a useful alternative.

In particular, it is an object to set forth a transformer, and a method for creating a transformer, that demonstrates a substantial reduction in AC losses in a magnetic field window.

According to a first aspect of the invention there is provided a superconducting transformer including a first primary winding for electrically connecting with an alternating power source, and having a first plurality of turns of superconducting tape; a second primary winding for electrically connecting with the source and extending, and having a second plurality of turns of superconducting tape; a first secondary winding for electrically connecting with a load, the first secondary winding magnetically coupled to the first primary winding and having a third plurality of turns of superconducting tape; a second secondary winding for electrically connecting with the load, the second secondary winding magnetically coupled to the second primary winding and having a fourth plurality of turns of superconducting tape; a sheath surrounding all of the windings; and wherein the first primary winding, the second primary winding, the first secondary winding, and the second secondary winding are concentrically nested; and wherein each respective winding is comprised of a twisted filament superconductor having one or more filaments.

According to a second aspect of the invention there is provided a superconducting transformer including:
  a first primary winding for electrically connecting with an alternating power source, and having a first plurality of turns of superconducting tape;
  a second primary winding for electrically connecting with the source, and having a second plurality of turns of superconducting tape;
  a first secondary winding for electrically connecting with a load, the first secondary winding magnetically coupled to the first primary winding and having a third plurality of turns of superconducting tape;
  a second secondary winding for electrically connecting with the load, the second secondary winding magnetically coupled to the second primary winding and having a fourth plurality of turns of superconducting tape;
  a sheath surrounding all of the windings; and
  a high resistive matrix metal, which carries coupling currents between the filaments, embedded in the superconductor;
  wherein the first primary winding, the second primary winding, the first secondary winding, and the second secondary winding are concentrically nested;
  wherein each respective winding is comprised of a twisted filament superconductor having one or more filaments; and
  wherein the high resistance matrix metal is largely composed of pure silver and is a metal alloy; and
  a coupling current loss in the window of the transformer's magnetic field is reduced—compared to an identical transformer having a matrix of pure silver without alloying elements—by the high resistance matrix metal.

According to a third aspect of the invention there is provided a method of producing superconducting transformer including:
  forming a first primary winding for electrically connecting with an alternating power source, and having a first plurality of turns of superconducting tape;
  forming a second primary winding for electrically connecting with the source, and having a second plurality of turns of superconducting tape;
  forming a first secondary winding for electrically connecting with a load, the first secondary winding magnetically coupled to the first primary winding and having a third plurality of turns of superconducting tape;
  forming a second secondary winding for electrically connecting with the load, the second secondary winding magnetically coupled to the second primary winding and having a fourth plurality of turns of superconducting tape;
  placing a sheath surrounding all of the windings; and
  wherein the first primary winding, the second primary winding, the first secondary winding, and the second secondary winding are concentrically nested and each respective winding is comprised of a twisted filament superconductor having one or more filaments.

BRIEF DESCRIPTION OF THE DRAWINGS

Preferred embodiments of the invention will now be described, by way of example only, with reference to the accompanying drawings in which:

FIG. 6 is a schematic perspective view of an alternative embodiment of the transformer of FIG. 1, 2 or 3;

DETAILED DESCRIPTION

A preferred embodiment of the invention utilises interleaving of windings to leverage the potential benefits of superconducting loss-reducing techniques. Accordingly, several interleaving configurations, the core gaps, tapes and filaments will first be discussed, therefore turning to the interplay of the nesting with twisting techniques and certain stabilising metals.

Figure 1:
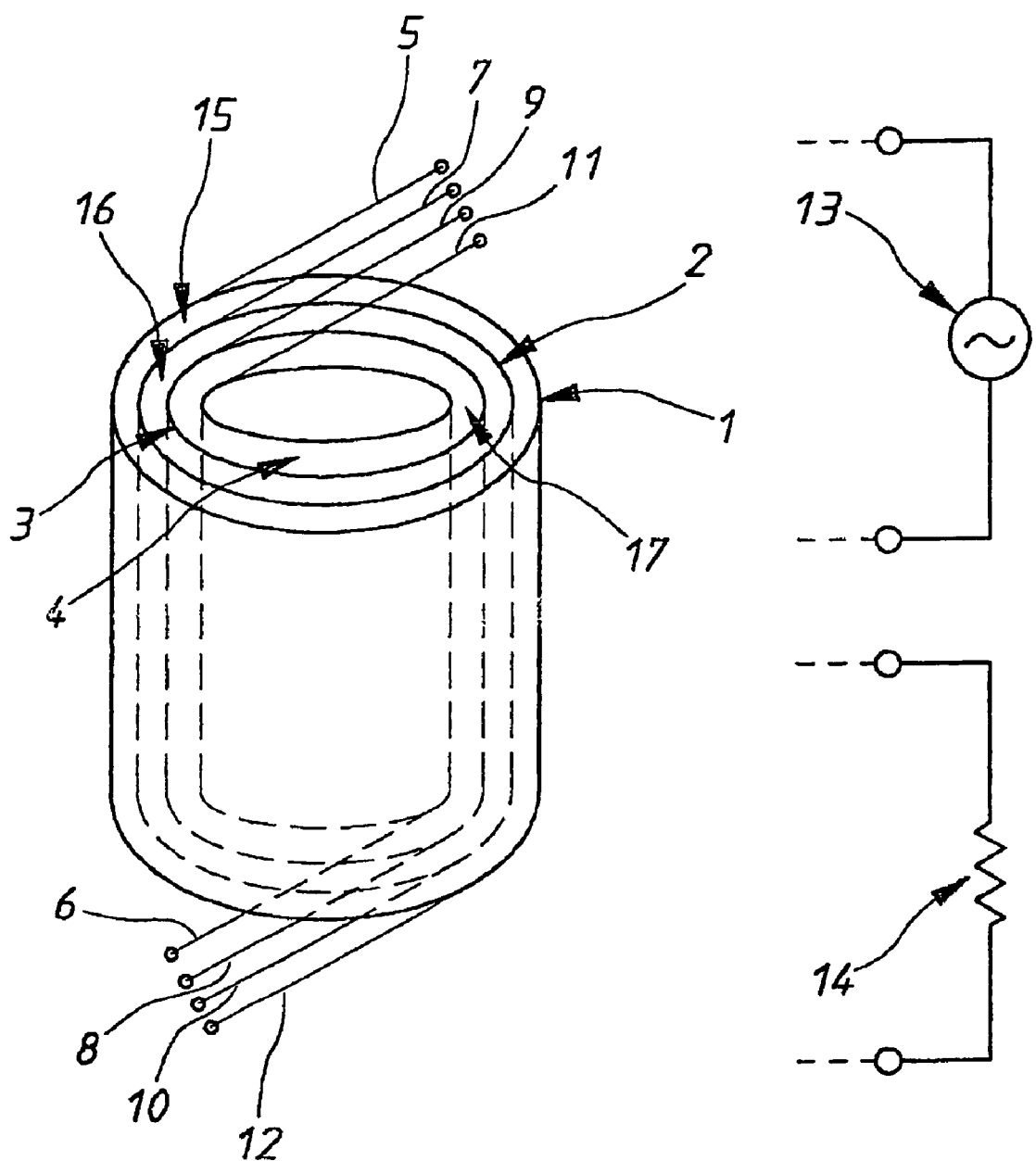
FIG. 1 is a schematic perspective view of a transformer according to the invention.

Referring to FIG. 1, there is provided a superconducting transformer including two pairs of axially extending windings 1, 2, 3 and 4. The windings are each in the form of a right cylindrical solenoid having a circular cross-section which are substantially concentrically nested.

In other embodiments, the windings are cylindrical with a square cross-section. In yet other embodiments, the windings are cylindrical with a polygonal cross-section.

Each winding includes a plurality of turns formed from superconducting tape. Each winding respectively includes a first end and a second end 5 and 6, 7 and 8, 9 and 10, and 11 and 12 which are configured for electrical connection with at least one of the other ends, an alternating power source 13, a load 14, or other passive or active electrical components.

The transformer includes a first axially extending primary winding 1 corresponding to the outermost winding and a first axially extending secondary winding 2 nested within the first primary winding. A second axially extending primary winding 3 is nested within the first secondary winding 2. A second axially extending secondary winding 4 is nested within the second primary winding 3 such that the second secondary winding 4 corresponds to the innermost winding.

Alternate windings are respectively configured for electrical connection to the alternating power source and the load. That is, ends 5 and 6, and 9 and 10 are configured for electrical connection to source 13. Ends 7 and 8, and 11 and 12 are respectively configured for electrical connection to load 14. The ampere turns of windings 1 and 3, and 2 and 4 are substantially the same.

Alternate windings 1 and 3 are electrically connected by superconducting tape in series at ends 6 and 10, and ends 5 and 9 are respectively connected across source 13. Similarly, alternate windings 2 and 4 are electrically connected by superconducting tape in series at ends 8 and 12, and ends 7 and 11 are electrically connected across load 14.

The transformer further includes three predetermined gaps 15, 16 and 17 which define the radial separation of the nested windings. A predetermined core gap 18 defines the diameter of the second secondary, or innermost, winding 4.

Figure 2:
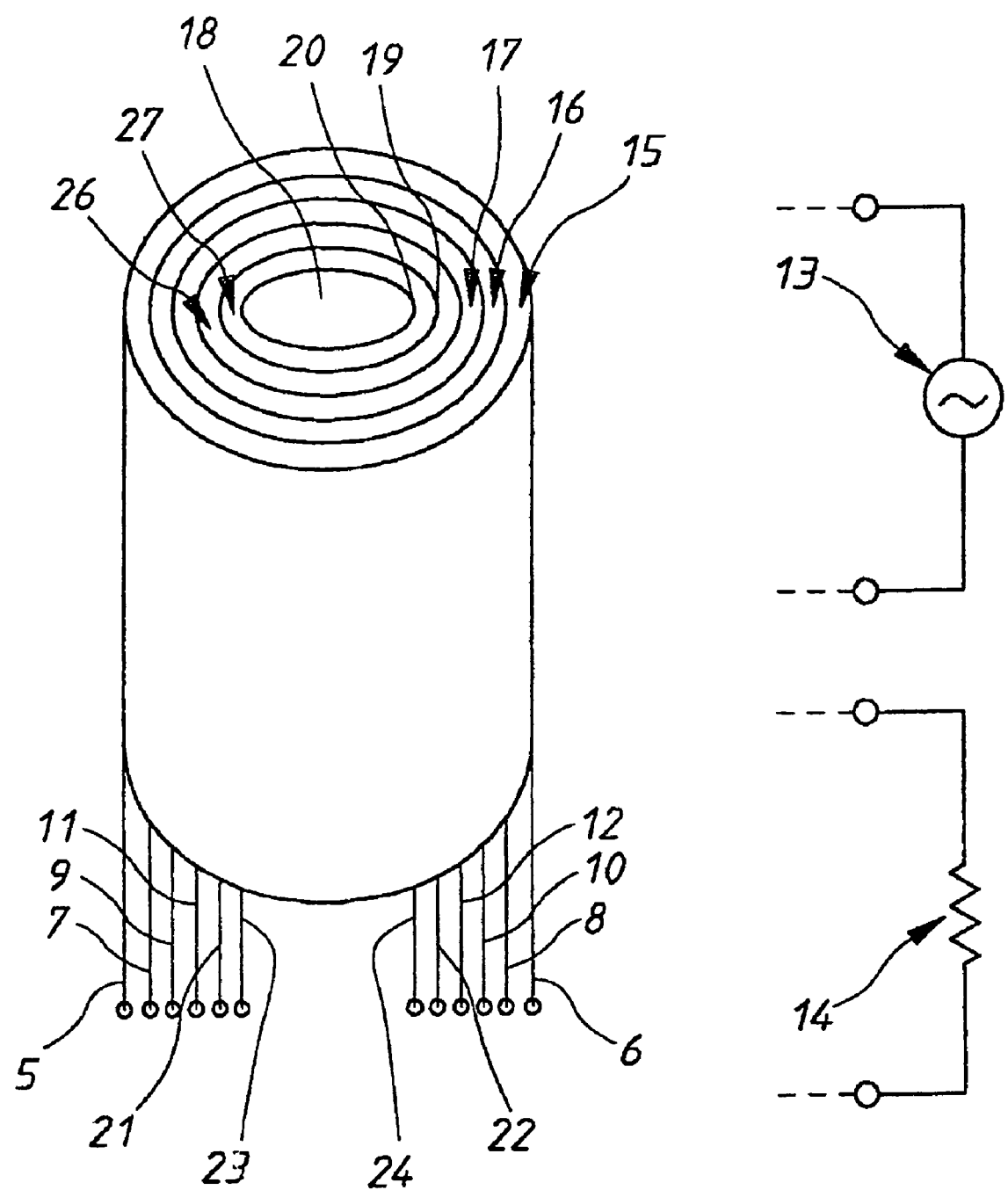
FIG. 2 is a schematic perspective view of another embodiment of the transformer of FIG. 1.

Referring to FIG. 2, where corresponding features are denoted by corresponding reference numerals, there is illustrated a transformer including three pairs of axially extending windings. A third axially extending primary winding 19 is nested within winding 4 and includes two ends 21 and 22 respectively configured for electrical connection with at least one of the other ends, source 13, load 14, or other passive or active electrical components. A third secondary winding 20 is nested within winding 19 and includes two ends 23 and 24 which are respectively configured for electrical connection with at least one of the other ends, source 13, load 14, or other passive or active electrical components.

A fourth and fifth predetermined gap 26 and 27 respectively define the radial separation of the nested windings. That is, gap 26 defines the space between winding 4 and 19, and gap 27 defines the radial separation between winding 19 and 20. In this embodiment, the core gap 18 corresponds to the inner diameter of winding 20.

Winding 19 and 20 each include substantially the same number of ampere turns as winding 1 and 2, and winding 3 and 4.

The alternate windings, being electrically connected by superconducting tape in series, are configured such that ends 9 and 21, and ends 6 and 10 are electrically connected, and ends 5 and 22 are electrically connected across source 13. The other alternate windings, also being electrically connected by superconducting tape in series, are configured such that ends 11 and 23, and ends 8 and 12 are electrically connected, and ends 7 and 24 are electrically connected across load 14.

The five gaps 15, 16, 17, 26 and 27 and core gap 18 are filled with air. In other embodiments, gap 18 is occupied substantially by a material for concentrating the magnetic field. In yet other embodiments, the material occupies substantially all of the gaps. Alternatively, the gaps are occupied by liquid nitrogen, liquid helium, liquid neon, or other suitable cryogen.

As shown in FIG. 6, the transformer includes a pair of opposed and coplanar closed loops 80 and 81 formed from the material and sharing a common portion 82. As shown, portion 82 occupies a substantial volume of gap 18. The material in this embodiment is iron although, in other embodiments the material is a ferrite substance.

Other alternative embodiments employ gap 18 as a conduit to transport cryogen, in the form of liquid nitrogen, for cooling the windings. This occurs both instead of or in addition to the disposition of the material in gap 18.

Figure 3:
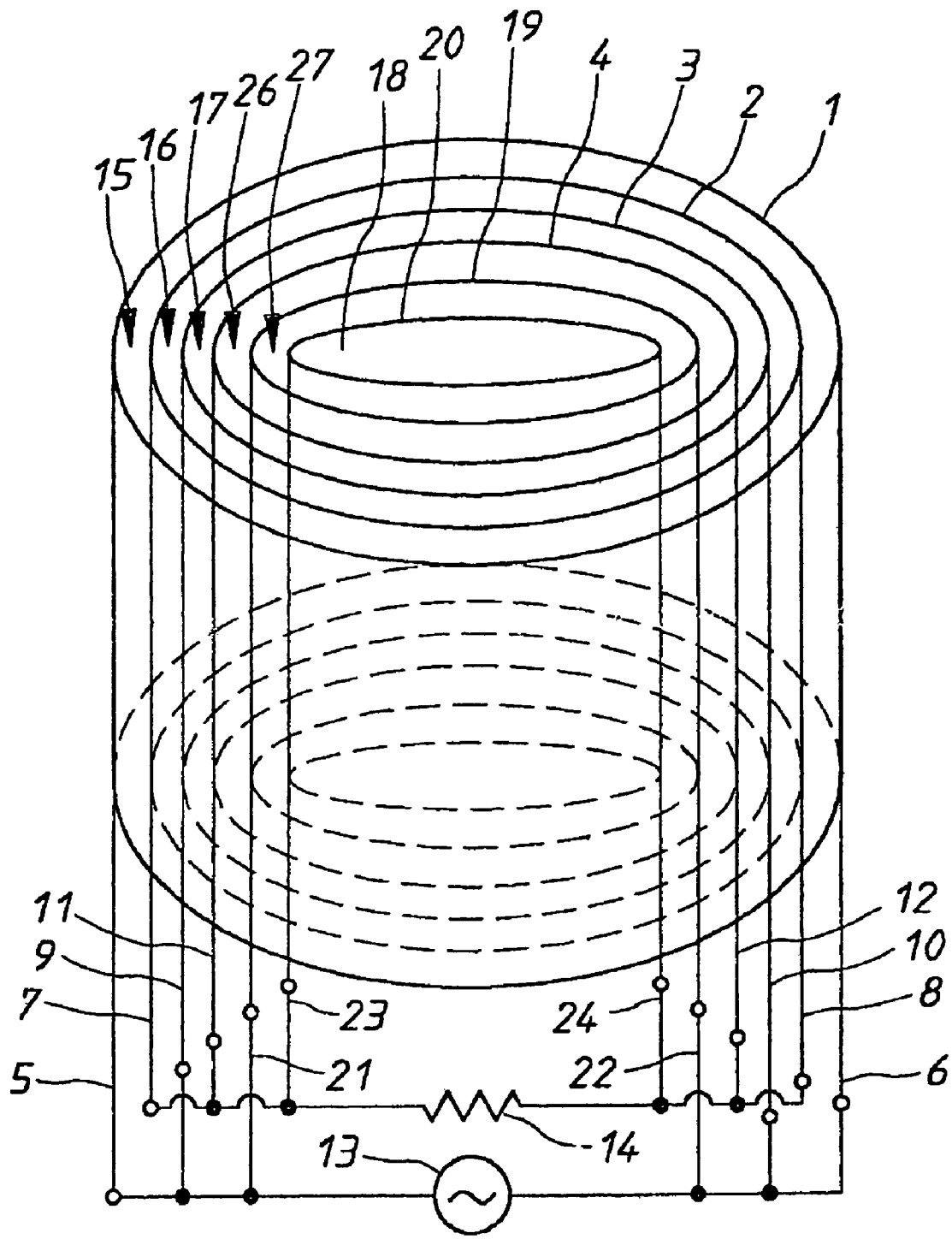
FIG. 3 is a schematic perspective view of another embodiment of the transformer of FIG. 1.

Referring to FIG. 3, there is illustrated a transformer including three pairs of substantially concentrically nested windings 1, 2, 3, 4, 19 and 20. Primary windings 1, 3 and 19 are respectively electrically connected together in parallel to source 13 by means of electrical connection at ends 5 and 6, 9 and 10, and 21 and 22.

Similarly, ends 7 and 8, 11 and 12, and 23 and 24 of windings 2, 4 and 20 are each respectively connected across load 14.

Figure 4:
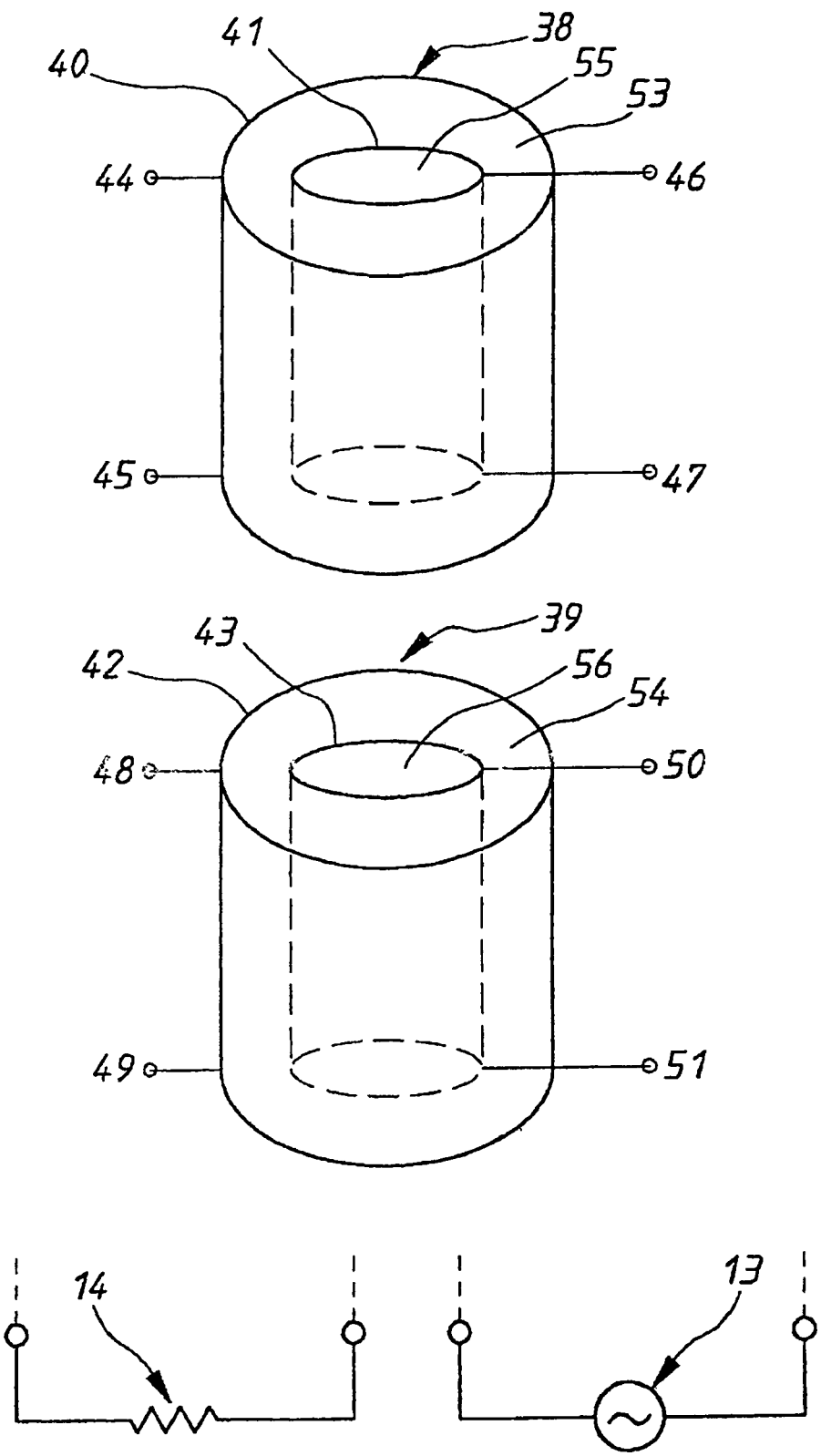
FIG. 4 is a schematic perspective view of an alternative embodiment of a superconducting transformer according to the invention.

Referring to FIG. 4 there is illustrated another aspect of the superconducting transformer including an axially extending primary winding 38 having a plurality of axially extending windings 40 and 41. The windings are substantially concentrically nested circular cross-sectioned solenoids. Each winding 40 and 41 includes a plurality of turns of superconducting tape having ends 44 and 45, and 46 and 47 which are respectively configured for electrical connection to source 13.

The transformer further includes an axially extending secondary winding 39 disposed coaxially with and longitudinally spaced apart from winding 38. Winding 39 includes a plurality of axially extending windings 42 and 43. These windings are substantially concentrically nested circular cross-sectioned solenoids. Each winding 42 and 43 includes a plurality of turns of superconducting tape having ends 48 and 49, and 50 and 51 which are respectively configured for electrical connection to load 14.

Windings 40 and 41 in winding 38 are electrically connected in series by having ends 45 and 47 electrically connected with superconducting tape. The other ends 44 and 46 of windings 40 and 41 are electrically connected across source 13.

Similarly, windings 42 and 43 of winding 39 are electrically connected by in series by having ends 49 and 51 electrically connected by superconducting tape. Other ends 48 and 50 of windings 42 and 43 are electrically connected across load 14.

In other embodiments, not shown, ends 44 and 45 of winding 40 and ends 46 and 47 of winding 41 are each electrically connected in parallel across source 13. Similarly, ends 48 and 49 of winding 42 and ends 50 and 51 of winding 43 are each electrically connected in parallel across load 14.

The transformer includes a first gap 53 and a second gap 54 which respectively correspond to the radial separation of the windings 40 and 41 and windings 42 and 43. Winding 38 includes a first predetermined core gap 55 which corresponds to the inner diameter of winding 41. Similarly, winding 39 includes a second predetermined core gap 56 corresponding to the inner diameter of winding 43.

Figure 5:
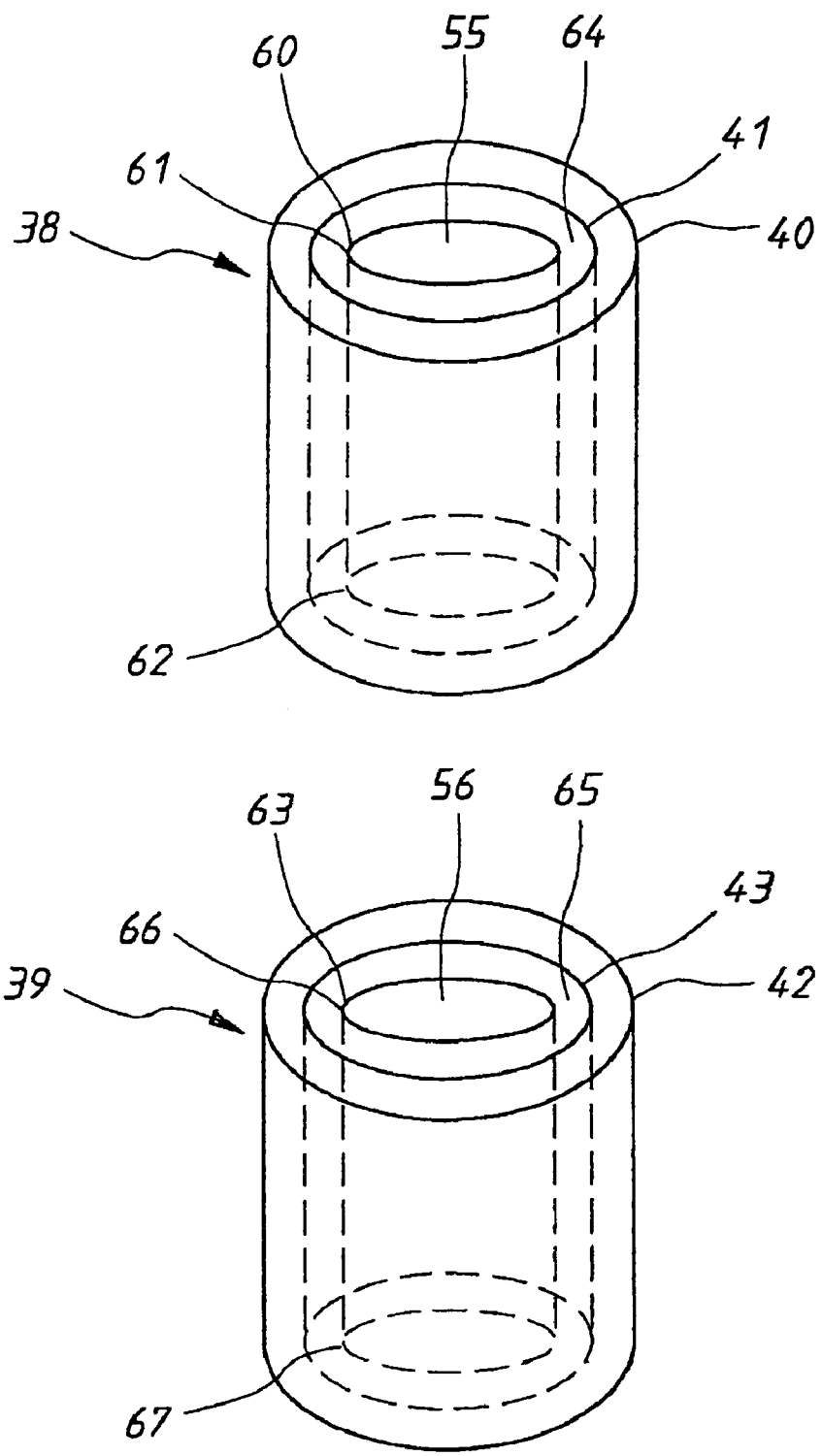
FIG. 5 is a schematic perspective view of another embodiment of the transformer of FIG. 4.

Referring to FIG. 5, there is illustrated an alternative embodiment of the transformer of FIG. 4 where winding 38 includes a third winding 60 which is substantially concentrically nested within winding 41. Winding 39 also includes a third winding 63 substantially concentrically nested within winding 43. Windings 60 and 63 are formed from superconducting tape into a circular cross-sectioned solenoid and respectively include ends 61 and 62, and 66 and 67 which are configured for electrical connection to at least one of the other ends, source 13, load 14, or other passive or active electrical components.

The transformer further includes a third gap 64 which defines the radial separation of windings 41 and 60 and a fourth gap 65 which defines the radial separation of windings 43 and 63. In this embodiment, core gaps 55 and 56 respectively define the inner diameter of windings 60 and 63.

The ampere turns of windings 60 and 63 are substantially the same as the ampere turns of windings 40 and 42, and windings 41 and 43 respectively.

The constituent windings of winding 38 are electrically connected in series and subsequently connected across source 13. That is, ends 46 and 60 are electrically connected by superconducting tape, ends 45 and 47 are electrically connected by superconducting tape, and ends 44 and 61 are respectively connected across source 13. Similarly, in winding 39, windings 42, 43 and 63 are electrically connected in series by superconducting tape and are electrically connected across load 14. That is, ends 50 and 66 are electrically connected by superconducting tape, ends 49 and 51 are electrically connected by superconducting tape, and ends 48 and 67 are respectively connected across load 14.

In other embodiments, ends 44 and 45, 46 and 47, and 60 and 61 are respectively electrically connected across source 13. Ends 48 and 49, 50 and 51, and 66 and 67 are respectively electrically connected across load 14.

The ampere turns of windings 40 and 42 are substantially the same as the ampere turns of windings 41 and 43, and windings 60 and 63.

Gaps 53, 54, 64 and 65, as well as core gaps 55 and 56, are filled with air. In other embodiments, however, these gaps are occupied by air and a material occupies the volume of core gaps 55 and 56. In yet other embodiments, all of the gaps and the core gaps are filled with the material.

The transformer includes a pair of opposed and coplanar closed loops 80 and 81 formed from the material and sharing a common portion 82 which is configured to occupy a substantial volume of the predetermined core gaps. The material is iron, however, in other embodiments the material is ferrite.

In further embodiments of the invention, the volume corresponding to core gaps 55 and 56 is used as a conduit to transport cryogen, in the form of liquid nitrogen, to cool the windings from the inside out. Alternatively, liquid neon or helium, or the like may be used as the cryogen.

In some further embodiments, not illustrated, the volume occupied by the predetermined core gaps is filled with air and the transformer is disposable within a hollow and substantially toroidal cooling chamber. The chamber has an open centre portion that is configured for receiving common portion 82 of loops 80 and 81 so that the material occupies at least part of the volume of core gaps 55 and 56. Further, the hollow portion is configured to receive not only the transformer, but also to receive cryogen in the form of liquid nitrogen.

The superconducting tape which forms windings 1, 2, 3, 4, 40, 41, 42, 43, and 60 and 63 is of the powder-in-tube type. Accordingly, the tape includes a plurality of longitudinally extending filaments of superconducting material embedded in a metal in some preferred embodiments and in a metal alloy based matrix in other preferred embodiments. In some preferred embodiments, the metal is silver, and in others it is gold. In some preferred embodiments, the metal alloy is silver alloy, and in others metal alloy is gold alloy. In other embodiments, alloys are at least one of Aluminium (Al), Antimony (Sb), Copper (Cu), Gold (Au), Manganese (Mn), Magnesium (Mg), Palladium (Pd), Nickel (Ni), and Zirconium (Zr).

The filaments within the superconducting tape are twisted to a pitch P which is appropriate for the particular design. For example, higher magnetic field designs will require superconductors with a smaller filament pitch.

In a preferred embodiment, the thickness of each filament is less than 40 microns and the overall tape thickness ranges from 0.10 mm to 1.20 mm. In other embodiments, the overall tape thickness is 0.20 mm to 1.20 mm and the tape width is 1.8 mm to 20 mm. The superconducting material employed in the superconducting tape is BSCCO-2223.

In some embodiments, it is necessary to place a number of superconducting tapes in a given winding in parallel. In particular, secondary windings 2, 4, 20, 42, 43, or 63, include a plurality of tapes in parallel when, for example, the primary winding can only be driven by 40 Amps and the secondary winding is required to conduct 120 Amps. In such an example, three tapes need be put in parallel to provide the necessary current carrying capacity. However, in this and other arrangements, it is preferred to transpose the three tapes at every third of the length of the secondary winding to equalise the impedance presented by each conductor.

In another example, should 200 Amps be required in the secondary winding and the primary can only be driven by 40 Amps, then five tapes would need to be placed in parallel in the secondary winding and each tape transposed every fifth of the total length of the winding. Further, in this and other embodiments it is preferable for the individual tapes are electrically insulated from each other.

The combination of individual tape insulation and transpositioning significantly reduces eddy current loss through the elimination of current flow from conductor to conductor. The transpositioning forces the current to split evenly between the five tapes, which would otherwise result in the non-uniform distribution of current amongst the tapes and severely overload one or two tapes at the expense of the other three.

It will be appreciated by those skilled in the art that any superconducting tape or wire may be employed in windings of the superconducting transformers disclosed herein. Examples of such wires and tapes are disclosed in the PCT patent applications having the publication numbers WO99/48115, WO99/48116, WO99/48117 and WO99/48159 and are herein incorporated by way of cross reference.

By providing a plurality of nested windings, each turn of the conductor within each winding is arranged closer to each compensating turn of the other winding, significant reductions in the magnetic field may be obtained.

In general, for the primary and secondary winding each including a pair of windings, the impedance of the transformer will be reduced by approximately half. For the case where each of the primary and secondary windings each include three concentrically nested windings, the transformer will provide one third of the impedance. Similarly for four windings in each of the primary and secondary windings, the impedance will be reduced by a factor of 4.

For example, consider a superconductor transformer employing a standard winding arrangement having a single primary and single secondary winding that produces a 300 mT peak field amplitude and a total superconductor loss of Q. By employing a single level of nesting, peak field amplitude is reduced to 150 mT; two levels of nesting reduce the peak field amplitude to 75 mT; and three levels of nesting reduce the peak field amplitude to 38 mT.

As stated earlier, hysteresis loss reductions will be proportional to the reduction in peak field amplitude, between a factor of one and four, depending on a number of factors. Accordingly, the hysteresis loss will be at least halved each time an additional level of winding is added; (that is, the hysteresis loss will be reduced by up to $(1/2)^x$, where x is the number of levels of interleaving.

As described herein, the technique is not limited to subdividing the primary and secondary windings into pairs of concentrically nested sub-windings. Indeed, up to N/2 levels of interleaving can be used, where N is the total number of turns in a winding.

Employing this technique requires each turn to be placed as close together as possible with respect to the clearance required between them due to the voltage levels—next to its partner turn in the other winding. However, because of the need to insulate the windings, the number of windings included in each of the primary and secondary windings is commercially speaking—although not necessarily physically per se—limited to approximately three windings each.

By employing a twisted filament, a transformer's (or other devices') hysteresis losses can be reduced dramatically further; that is, they are 2 to 6 times less—as compared to comparable non-twisted transformers. Importantly, since this added reduction from twisting only occurs in a limited window of the transformer's magnetic field amplitude; (that is 20 mT to 80 mT in a preferred embodiment), the invention employs interleaving to reduce the magnetic field to a level where such benefits are captured.

Although twisting actually increases coupling current losses in this window—which are zero without twisting—the reduced hysteresis losses always outweigh the coupling current increases. Thus, on balance, twisting consistently reduces superconducting losses.

Examples of AC devices include transformers with a 1:1 winding arrangement such as fault current limiting transformers. Other applications include at least: step-up transformers, generator transformers, furnace transformers, rectifying transformers, and phase change transformers.

In the above example of the transformer with three levels of nesting (and therefore a reduced field of 38 mT), hysteresis loss is reduced to approximately ⅛ of its original amount—i.e. a $(1/2)^3$ reduction—due to the nesting alone. However, by employing twisted filament and interleaving the transformer's winding to bring the magnetic field into the 20 mT to 80 mT window where the hysteresis advantages of twisting are leveraged, the hysteresis loss is further reduced to 1/16 (i.e. Q/8×½) to 1/48 (i.e. Q/8×⅙) of its original amount—depending on the tape used (that is, the exact superconductor used—twist pitch and matrix material).

Continuing with this example, coupling current losses—resulting from the twisted filaments—will actually increase as the magnetic field amplitude first reduced into the 20 to 80 mT window. However, interleavings added once the 80 mT window is entered will then cause a ¼ reduction in the coupling current that has arisen.

The AC loss reduction will be always a positive one. For example, the magnitude of the reduced hysteresis losses will always outweigh the increase in coupling current losses when the 80 mT window is first entered. Likewise, further interleavings will result in both a reduction in hysteresis losses (½ to ⅙ for each level of interleaving) and a reduction in coupling current losses (¼ for each additional level of interleaving).

Accordingly, if the magnetic field begins above 80 mT, upon entering the 20 mT to 80 mT window, the AC loss will be:

Hysteresis Loss×$((1/2)^{\text{\# of levels of interleaving upon entering window}})$×(½ to ⅙)

−Added Coupling Current Loss

=AC Loss Reduction

=Superconducting Loss Reduction

Further interleavings within the 20 mT to 80 mT range result in losses of:

Hysteresis Loss×$((1/2)^{\text{total \# of levels of interleaving}})$×(½ to ⅙)

−Added Coupling Current Loss

+Added Coupling Current Loss×$((1/2)^{2\times(\text{\# of levels of interleaving after entering window})})$ =AC Loss Reduction =Superconductor Loss Reduction Moreover, as further explained below, coupling current losses may be further reduced by adding matrix alloys to increase path resistance.

A preferred embodiment of the invention reduces coupling current by using certain stabilising metals and alloys. In essence, this reduction is accomplished by increasing the resistance in the coupling current path, as explained below.

Superconductors are embedded in stabilising metals or alloys for obvious commercial reasons. However, in AC applications, such as transformers, these stabilising materials actually participate electro-magnetically by carrying coupling currents which flow between the filaments, and then along the superconductor. Thus, part of the coupling current path is superconducting, and part is through the metal or alloy matrix. In this way, the coupling currents give rise to a loss—as would any current flowing in a metal—which is inversely proportional to the resistance of the matrix material.

In light of the above, coupling current losses are reduced by adding a relatively high resistance alloy to the non-superconducting path. The degree to which the coupling current losses are reduced depends on the alloy or combination of alloys used. These alloys include at least: Aluminium (Al), Antimony (Sb), Copper (Cu), Gold (Au), Manganese (Mn), Magnesium (Mg), Palladium (Pd), Nickel (Ni), and Zirconium (Zr). Further, the range of coupling current loss reduction is from 0.001% to 100%.

The percentage of alloy added to the silver at least depends on the alloy added. For example, in alternative embodiments, the amount of gold added is up to 7 wt %; whereas other alloys are in the 0.2 to 0.5 wt % range. Thus, if the magnetic field begins above 80 mT, upon entering the 20 mT to 80 mT window, the AC loss will be:

Hysteresis Loss×$((1/2)^{\# \text{ of levels of interleaving upon entering window}})$×(½ to ⅙)

−(0.001 to 0.999)×(Added Coupling Current Loss)

=AC Loss Reduction

=Superconductor Loss Reduction

Further interleavings within the 20 mT to 80 mT range result in losses of:

Hysteresis Loss×$((1/2)^{\text{total } \# \text{ of levels of interleaving}})$×(½ to ⅙)

−Added Coupling Current Loss

+(0.001 to 0.999)×Added Coupling Current Loss×$((1/2)^{\text{total } \# \text{ of levels of interleaving after entering window}})$ =AC Loss Reduction =Superconductor Loss Reduction Importantly, as alluded to above, these alloys have little or no benefit if twisting is not used and the magnetic field amplitude is not in the 20 mT to 80 mT range. If the filaments are too close, coupling currents do not flow between them, and the whole filamentary structure behaves as one large filament for the purposes of measuring the AC loss.

The graphs of FIG. 10 have been produced from a number of embodiments of the invention where use is made of twisting and interleaving. The graphs provide both logarithmic and linear forms, and some changes to the extremities of the scales used, to demonstrate the differences between the embodiments, the theory based calculations, and the control samples.

Figure 10A:
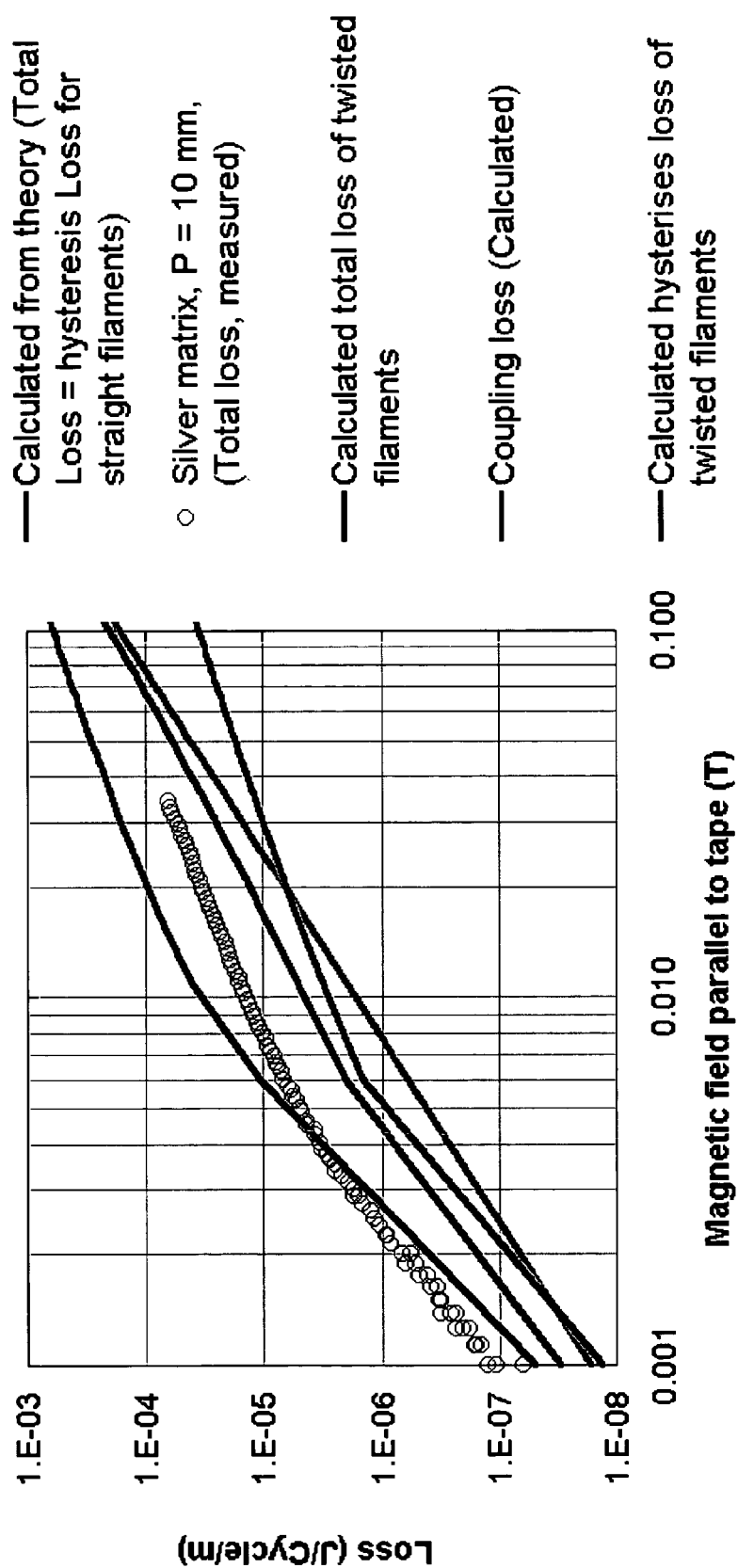
FIGS. 10(a) to 10(e) are respective graphs showing the reduced AC losses of some embodiments of the invention.

FIG. 10(a) compares the AC loss components of a 37 filament twisted tape (with a pitch of 10 mm) and a straight filament pure silver matrix tape. FIG. 10(c) is the same data plotted with a linear scale. The twisted 37 filament HTS tape has a pitch of 10 mm, a sheath consisting of an alloy of silver and magnesium of 0.15–0.2% by weight, and a matrix consisting of pure silver. This resulted in a ⅓ hysteresis reduction (relative to control samples), and in an overall total AC loss reduction by a factor of 2. The test results reflect 5 cm long tapes, 0.30 mm thick by 3.4 mm wide.

Figure 10B:
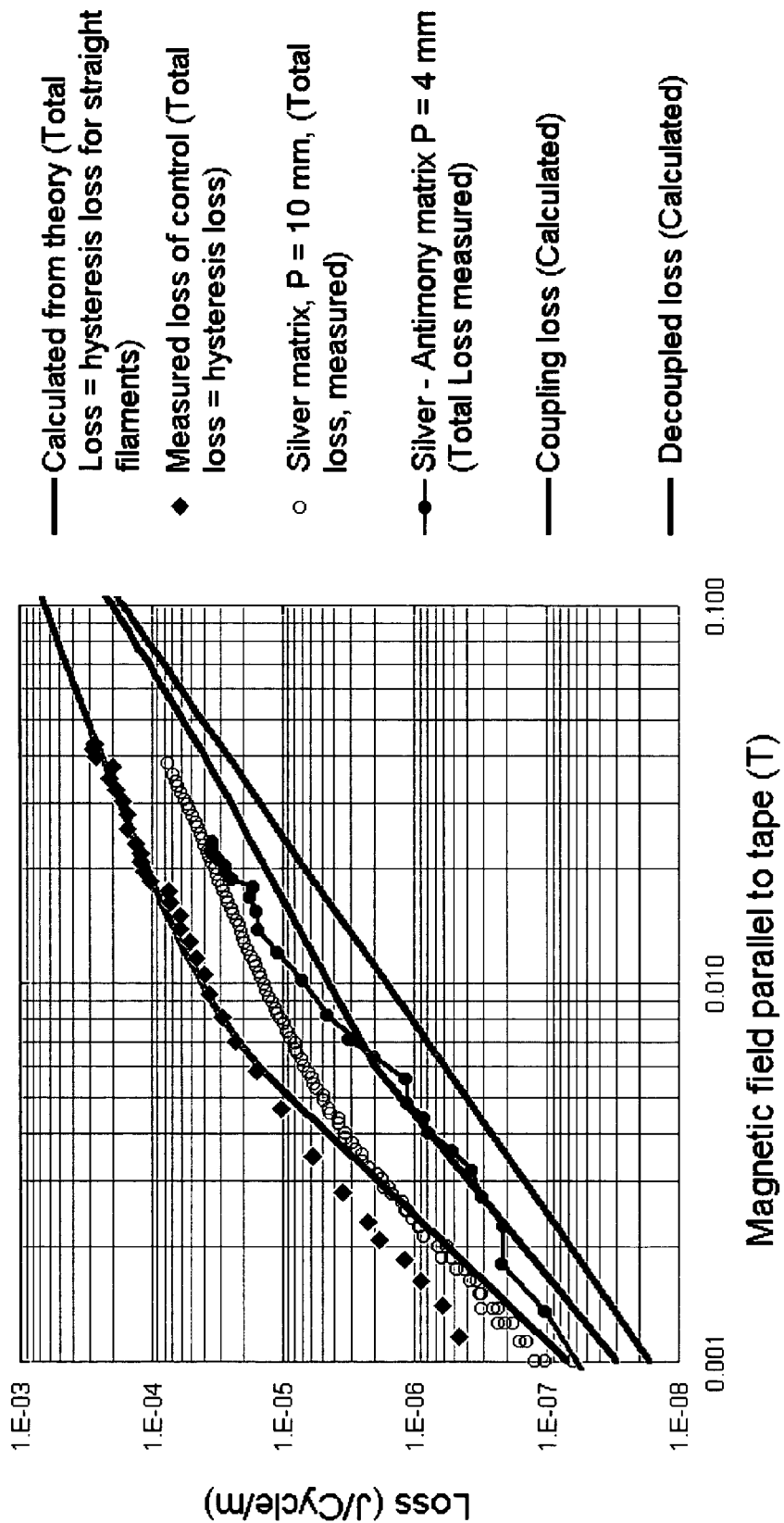
Figure 10C:
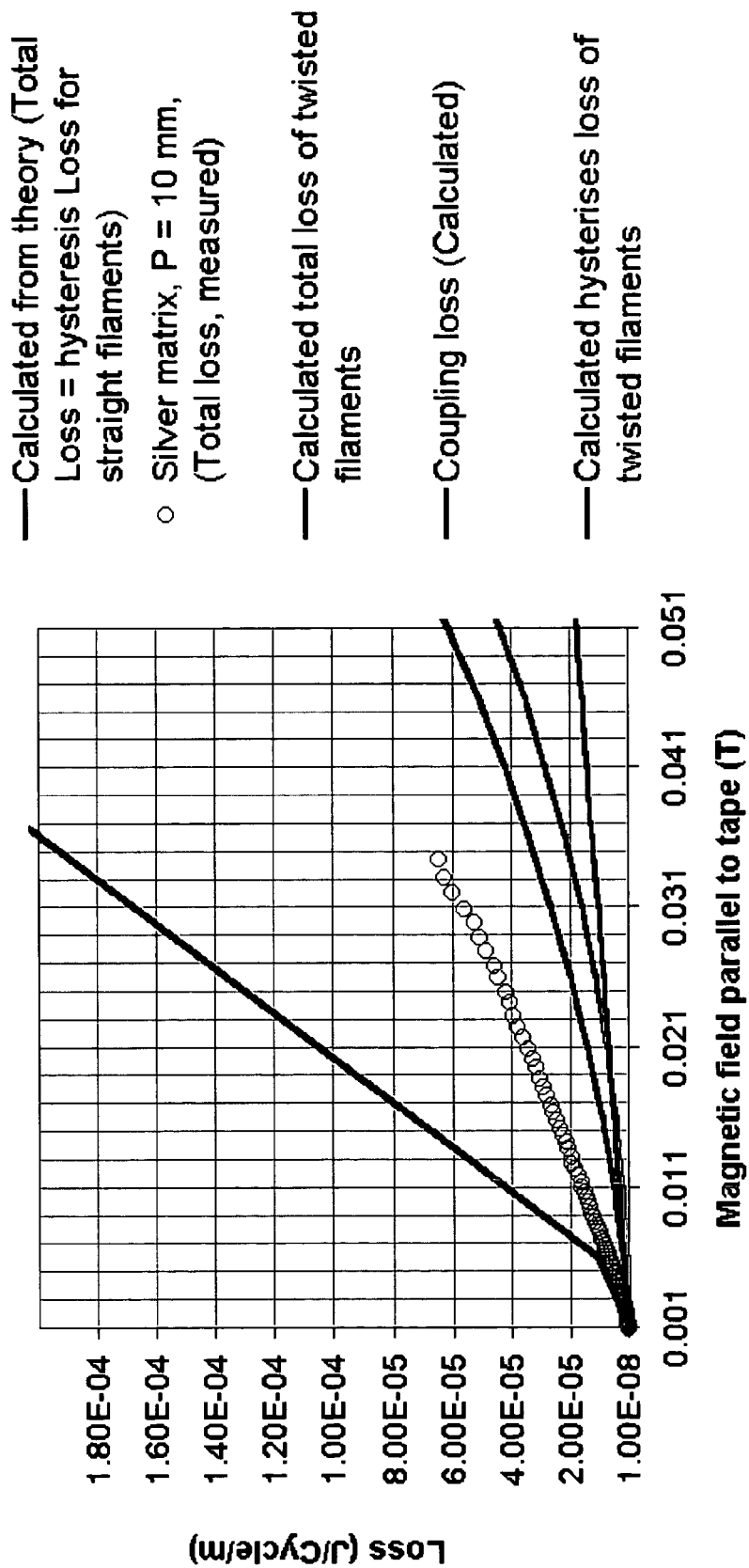
Figure 10D:
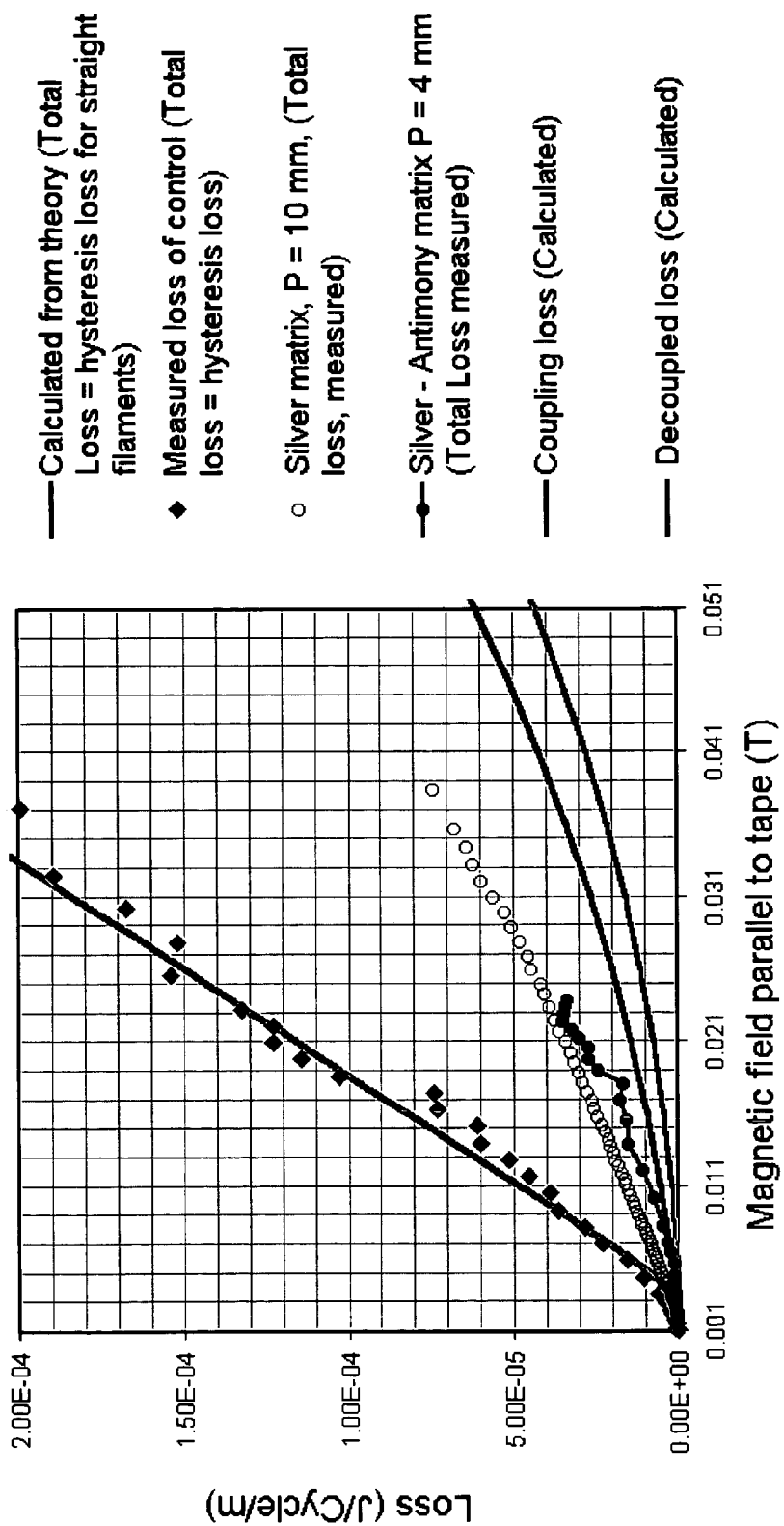

FIG. 10(b) relates to a twisted 37 filament HTS tape with a pitch of 4 mm, a sheath consisting of an alloy of silver with magnesium (element=Mg) at 0.15–0.2% by weight, and a matrix consisting of Silver with Antimony (element=Sb) 0.2% by weight. That is, the matrix is mostly pure silver, with small amounts of alloy added. This embodiment resulted in a ⅒ AC reduction (relative to control samples). The test results reflect 5 cm long tapes, 0.30 mm thick by 3.4 mm wide. FIG. 10(d) plots the data of FIG. 10(b) on a linear scale. FIG. 10(d) is included to demonstrate the relative performance using different extremities for the x-axis.

Figure 10E:
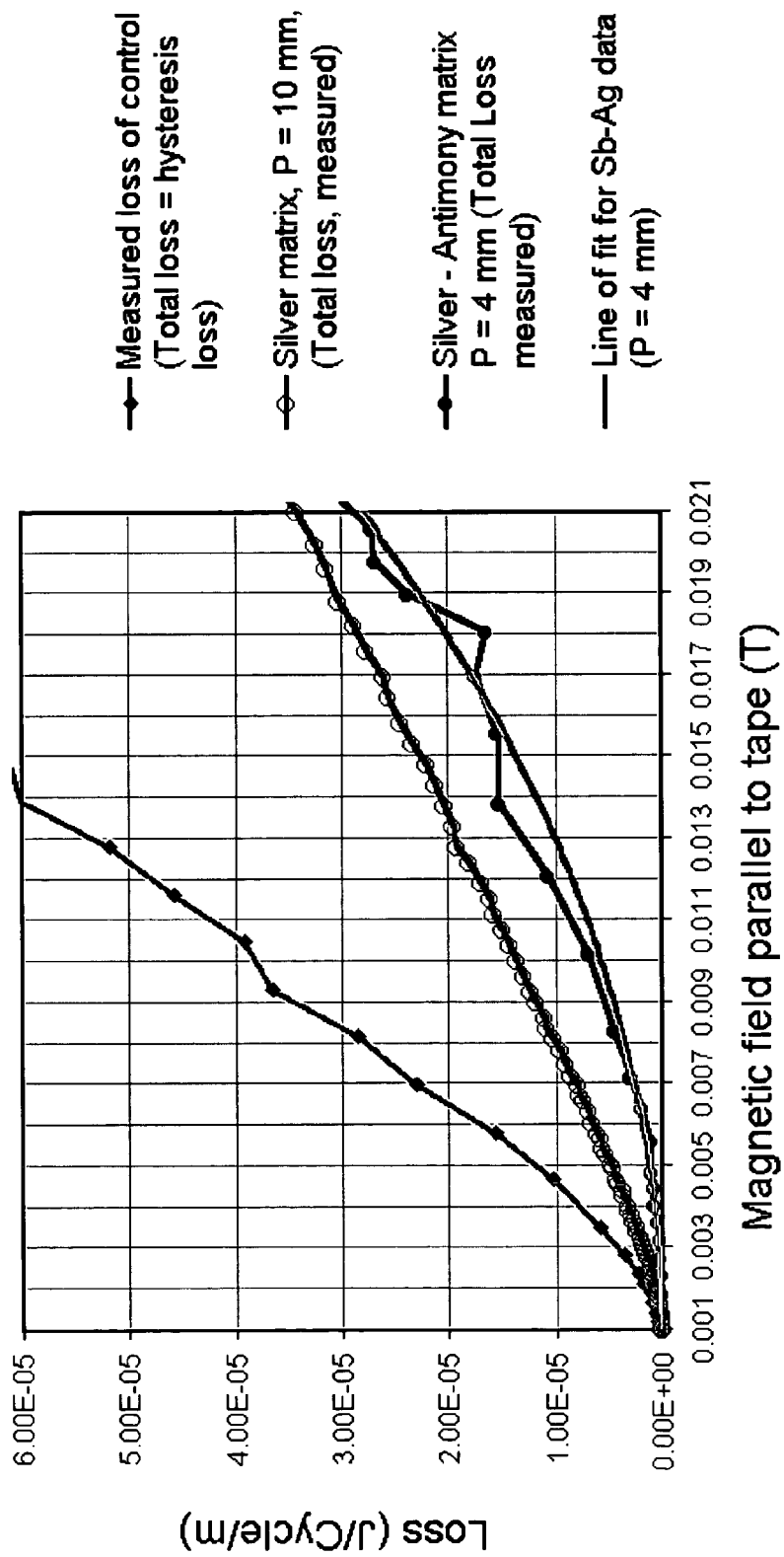

FIG. 10(e) is similar to FIG. 10(d), although with a different scale.

The above FIGS. 10(a) to (e) allow a comparison to be made between the total loss of the twisted filament tapes according to the embodiments of the invention and the total loss of the control sample—with the latter being a straight filament tape having pure silver matrix. This comparison shows that the pure silver matrix twisted filament tape (with a pitch P=10 mm) provides a reduction in total AC loss by a factor of three compared to the control sample (which has no twist), and that the Silver/Antimony alloy tape (P=4 mm) provides a reduction in total AC loss by a factor of five.

Superconducting devices require active cooling to keep them in their optimum operating temperature range. To provide this cooling sophisticated and well developed refrigerators are used, generally referred to as cryo-coolers. The heat taken away by a cryo-cooler from a device is called the cooling power of the device expressed in Watts. The electrical energy required from the power socket to provide that cooling power, (expressed in Watts), is a certain factor (the so called 'cryogenic penalty') times the cooling power. For an application at 77 K, that factor is about 15, but it can be as high as 22. A factor of 15 will be used here to illustrate.

It has been found that by reducing the Superconducting losses in the windings provides substantial savings in the necessary cooling power.

An example employing interleaving follows. Particularly, in a 100 kW three phase transformer, with an iron core, operating at a 60% average load with an efficiency of 99%, the superconducting losses are split between iron loss and winding losses. By employing primary and secondary windings, each including three substantially concentrically nested axially extending windings, the superconducting losses are reduced from approximately 20 Watts to about 2.5 Watts.

If this transformer is cooled by liquid nitrogen, the consumption is reduced from approximately 8.66 kilograms per day to approximately 1.08 kilograms per day. In an open system, this corresponds to approximately 12.5 litres of liquid nitrogen per day.

Assuming there exists a cryogenic penalty factor of 15 for liquid nitrogen from 77 K to 300 K, the power savings would be in the order of 262.5 Watts. (That is (20−2.5)*15=262.5 Watts). Further, as the transformer increases in size, the power savings also increase approximately linearly. For example, a 1 MVA transformer provides a saving of approximately 100 litres per day of liquid nitrogen and the cooling plant size required is reduced by 2.7 kW.

In addition to Superconducting losses, energy loss from current leads and heat leakage from external surroundings will also affect the cooling plant consumption. Assuming that the immediately above-described transformer includes a current lead leak of 0.045 $WA^{-1}$ per lead, where four leads are required, and a cryostat includes a heat leak of 5 Watts, then the 100 kVA transformer described above has 23 Watts of heat leak and approximately 20 Watts of superconducting losses. This represents a total loss of 43 Watts into the liquid nitrogen, which represents a requirement of approximately 645 Watts of cooling power at room temperature. By employing three nested windings and therefore reducing the superconducting losses in the windings to just 2.5 Watts in the primary and secondary windings, the total cooling power required is reduced to just 375 Watts, which represents approximately a 60% saving in the total cooling power rating. Clearly, no extra benefit from reduction in the winding losses can be obtained through twisted filament or novel superconductor because the power rating is too small and the background heat leak from the cryostat and the leads form a significant part of the loss, so twisted filament superconductor would not be used in this case.

In very large power transformers, Hysteresis losses are the most significant component. In general, as the power rating of the transformer increases the losses will increase, and the magnetic field impinging on the windings will also increase because there are more windings and the current is higher. For example, in a 26.5 MVA case study (an average power rating for a zone sub-station transformer), the superconductor loss of a non-nested primary and secondary coil set is of the order of 50 kW, and the magnetic field is of the order of 300 mT—these figures were calculated using a combination of FEM software modelling (Finite Element Methods) and in-house software. (The losses from leads and the cryostat are negligible compared to this factor.) Assuming a cryogenic penalty of 15 as discussed above, the power rating of the cryo-cooler would be 750 kW (50×15)—a significant power consumption compared to the device rating. By employing three levels of nesting, and reducing the magnetic field to 38 mT, the superconductor loss is reduced to 6.25 kW (that is, without using twisted filament tape) and the cooling power reduced to 93.75 kW (coming from 6.25× 15—it is reduced 'to' this, not 'by' this amount).

By further employing twisted filament tape configured for reduced losses at or near 38 mT, the superconductor loss could be reduced to 1.04 to 3.125 kW (depending on the specifics of the design of the superconductor—the exact twist pitch and matrix material decided on by the design engineer after considering all the design factors). Further, the cooling power required is, therefore, reduced to between 15.6 to 46.875 kW, which represents a significant saving in capital and footprint compared to a 750 kW cryo-cooler.

The above example shows clearly that the application of either the art of nesting windings, or the art of using twisted filament superconductor alone will not result in a transformer with the lowest superconducting losses possible and therefore will not be of the highest efficiency possible. Only the combined action of an appropriate level of nesting, and the use of an appropriate low ac loss superconductor designed and manufactured according the degree of nesting, will result in the highest possible transformer efficiency.

If the nesting part of the present invention were applied to a conventional transformer having normally conductive windings such as copper, the maximum savings in Superconducting losses would equate to approximately 10% (that is, there is no equivalent art of twisting in conventional transformers because the conductors do not contain filament). This figure represents a portion of superconducting losses in these transformers that actually occur as a result of the stray field impinging on the non-superconducting conductors and is characterised entirely as eddy current loss. In these conventional transformers, joule heating in the winding contributes to more than 90% of the total winding losses. Therefore, although it would be practical to apply the nesting technique to conventional transformers, the advantage achieved is minimal when the cost of implementation is considered. That being said, in certain high frequency applications, such as 400 Hz transformers used in military applications for radar power supplies, the reduction in copper eddy current losses (which increase with the square of the frequency) may justify the division of the windings into multiple sets as is described here.

Figure 7:
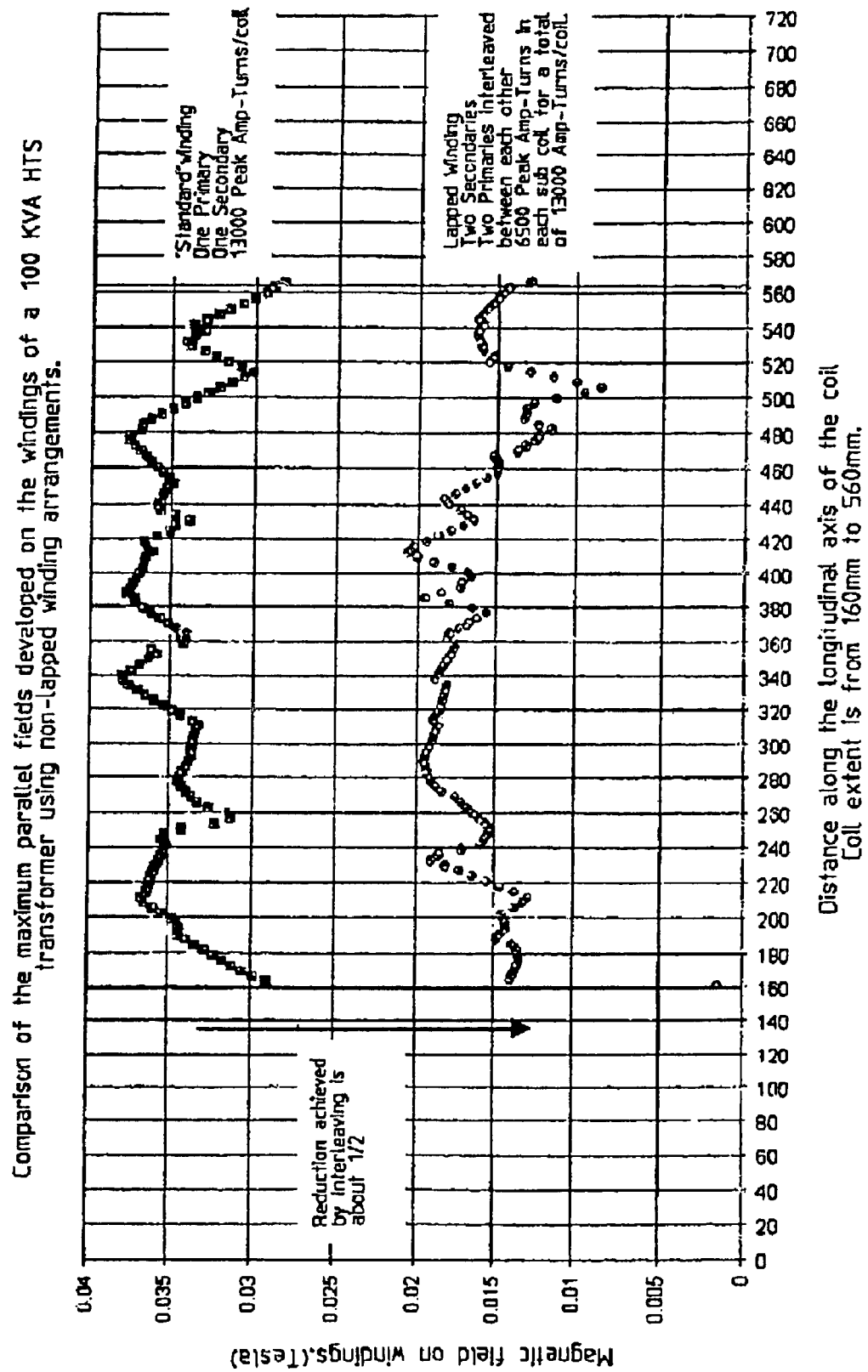
FIG. 7 is a plot of the magnetic field impinging on the superconducting windings of the transformer of FIG. 1 as a function of the axial position of the windings.

Some graphical results of a 100 kVA transformer according to the embodiment of the invention illustrated in FIG. 1, whose windings are formed from BSCCO-2223 high temperature superconducting tape, are shown in FIG. 7. The upper data corresponds to a superconducting transformer having only one pair of axially extending windings which are formed from superconducting tape and concentrically nested inside each other. The lower curve corresponds to the embodiment illustrated in FIG. 1. A reduction in the magnetic field impinging on the superconducting windings of the present invention of approximately 50% is observed.

Figure 8:
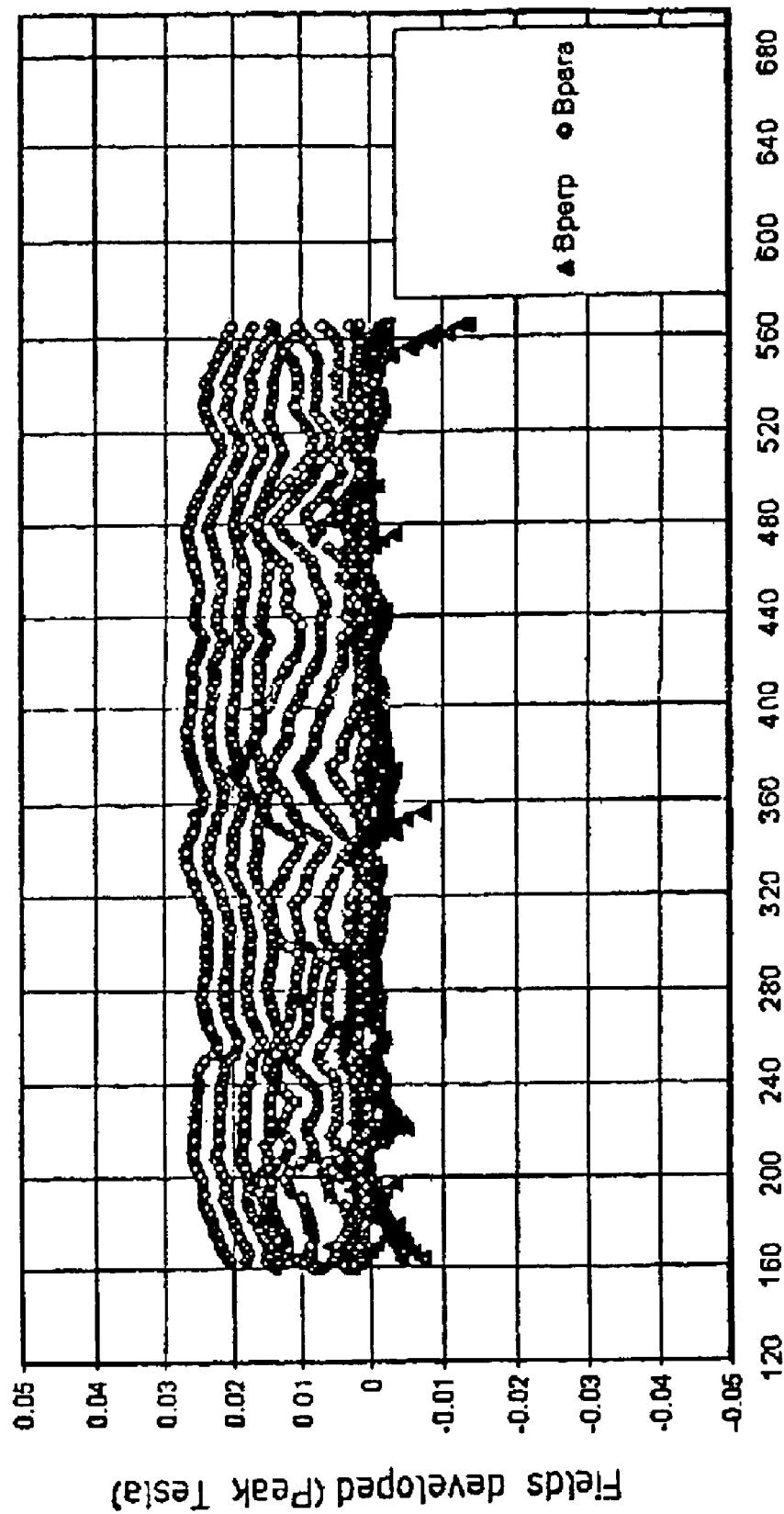
FIG. 8 and FIG. 9 are respective plots of the magnetic field for a winding according to the invention and a prior art winding.
Figure 9:
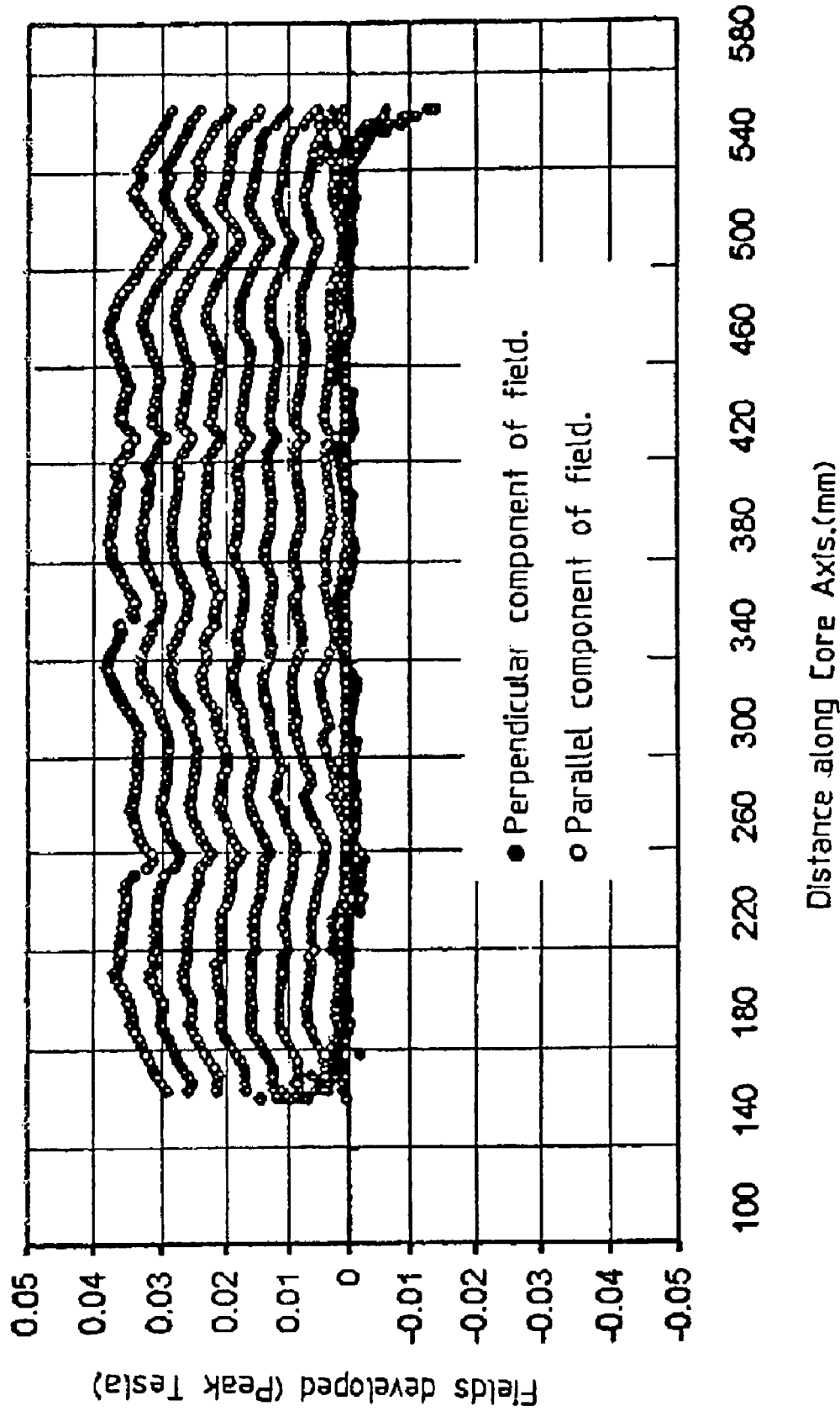

FIGS. 8 and 9 respectively provide additional indicative measurements of the magnetic field for a preferred embodiment and the prior art.

The Superconducting losses in the windings are calculated to be approximately 63 Watts at 300 K and 4.2 Watts at 77 K. This is compared with a conventional superconducting transformer that has an AC loss of and 7.3 Watts at 77 K. Further, it may be estimated that including three axially extending substantially concentrically nested coils provides a reduction in Superconducting losses from 110 Watts in the conventional transformer to 30 Watts.

Although the invention has been described with reference to specific embodiments and examples, it will be appreciated by those skilled in the art that the invention may be embodied in many other forms.

What is claimed is:

1. A superconducting transformer, comprising:
    a first primary winding for electrically connecting with an alternating power source, and having a first plurality of turns of superconducting tape;
    a second primary winding for electrically connecting with the source and having a second plurality of turns of superconducting tape;
    a first secondary winding for electrically connecting with a load, the first secondary winding magnetically coupled to the first primary winding and having a third plurality of turns of superconducting tape;
    a second secondary winding for electrically connecting with the load, the second secondary winding magnetically coupled to the second primary winding and having a fourth plurality of turns of superconducting tape;
    a sheath surrounding all of the windings; and
    wherein the first primary winding, the second primary winding, the first secondary winding, and the second secondary winding are concentrically nested; and
    wherein each respective winding is comprised of a twisted filament superconductor having one or more filaments.

2. A superconducting transformer according to claim 1, wherein the filaments provide a superconductor loss response to a self-generated magnetic field decreased relative to an identical superconductor transformer having a filament superconductor which is not twisted.

3. A superconducting transformer according to claim 1, wherein the filaments provide a superconductor loss response to an externally applied magnetic field decreased relative to an identical superconductor transformer having a filament superconductor which is not twisted.

4. A superconducting transformer according to claim 2, wherein at least a majority of the decreased superconductor loss response is a decreased hysteresis loss.

5. A superconducting transformer according to claim 2, wherein the decreased superconductor loss response occurs within a magnetic field window of the transformer.

6. A superconducting transformer according to claim 4, wherein the decreased superconductor loss response occurs within a magnetic field window of the transformer.

7. A superconducting transformer according to claim 5, wherein the window is about 20 mT to 80 mT.

8. A superconducting transformer according to claim 6, wherein the window is about 20 mT to 80 mT.

9. A superconducting transformer according to claim 5, wherein the window is approximately 30 mT to 70 mT.

10. A superconducting transformer according to claim 6, wherein the window is approximately 30 mT to 70 mT.

11. A superconducting transformer according to claim 1, wherein at least the first primary and the first secondary windings are interleaved with each other.

12. A superconducting transformer according to claim 1 wherein at least the second primary and the second secondary windings are interleaved with each other.

13. A superconducting transformer according to claim 1, wherein the first and second primary windings are interleaved with one another and the first and second secondary windings are interleaved with one another.

14. A superconducting transformer according to claim 11, wherein the decreased superconductor loss response is ½ to ⅙ larger than a loss response which would be seen in an identical superconductor having a filament superconductor which is not twisted.

15. A superconducting transformer according to claim 12, wherein the decreased superconductor loss response is ½ to ⅙ larger than a loss response which would be seen in an identical superconductor having a filament superconductor which is not twisted.

16. A superconducting transformer according to claim 13, wherein the decreased superconductor loss response is ½ to ⅙ larger than a loss response which would be seen in an identical superconductor having a filament superconductor which is not twisted.

17. A superconducting transformer according to claim 11, wherein the decreased superconductor loss response is ¼ to 1/12 larger than a loss response which would be seen in an identical superconductor having a filament superconductor which is not twisted and having a first primary winding and a first secondary winding that are not interleaved with each other.

18. A superconducting transformer, comprising:
a first primary winding for electrically connecting with an alternating power source, and having a first plurality of turns of superconducting tape;
a second primary winding for electrically connecting with the source and having a second plurality of turns of superconducting tape;
a first secondary winding for electrically connecting with a load, the first secondary winding magnetically coupled to the first primary winding and having a third plurality of turns of superconducting tape;
a second secondary winding for electrically connecting with the load, the second secondary winding magnetically coupled to the second primary winding and having a fourth plurality of turns of superconducting tape;
a sheath surrounding all of the windings; and
a high resistive matrix metal, which carries coupling currents between the filaments, embedded in the superconductor;
wherein the first primary winding, the second primary winding, the first secondary winding, and the second secondary winding are concentrically nested;
wherein each respective winding is comprised of a twisted filament superconductor having one or more filaments;
wherein the high resistance matrix metal is a metal alloy comprising of pure silver; and
wherein the high resistance matrix metal reduces a coupling current loss in a magnetic filed window of the transformer is reduced as compared to an identical transformer having a matrix of pure silver without alloying elements.

19. A superconducting transformer according to claim 18, wherein the high resistance matrix metal alloy comprises of Silver and Antimony.

20. A superconducting transformer according to claim 18, wherein the high resistance matrix metal alloy is at least 95% silver by weight.

21. A superconducting transformer according to claim 18, wherein the high resistance matrix metal alloy is approximately 99.8% silver by weight.

22. A superconducting transformer according to claim 19, wherein the high resistance matrix metal alloy consists of Silver and Antimony.

* * * * *